United States Patent [19]

Ball et al.

[11] 4,379,502

[45] Apr. 12, 1983

[54] WINCH CLUTCH

[75] Inventors: Harold M. Ball, Broken Arrow; Robert G. Beach, Tulsa, both of Okla.

[73] Assignee: Ramsey Winch Company, Tulsa, Okla.

[21] Appl. No.: 218,349

[22] Filed: Dec. 22, 1980

[51] Int. Cl.³ .......................... F16D 11/12; B66D 1/00
[52] U.S. Cl. .................................... 192/71; 192/93 C; 254/370
[58] Field of Search ............... 192/71, 93 C; 254/309, 254/355, 370

[56] References Cited

U.S. PATENT DOCUMENTS

| | | | |
|---|---|---|---|
| 1,380,917 | 6/1921 | McCarrell | 192/71 |
| 1,590,304 | 6/1926 | McCarrell | 192/71 |
| 1,808,770 | 6/1931 | Edwards | 254/370 |
| 2,379,320 | 6/1945 | Sprake | 192/71 |
| 2,498,399 | 2/1950 | Dodge | 192/71 |

Primary Examiner—Allan D. Herrmann
Attorney, Agent, or Firm—Ralph E. Zimmerman

[57] ABSTRACT

A winch clutch which comprises a cable drum, a power shaft with at least four slots spaced equidistant apart on the surface of the said power shaft; a cylindrical clutch housing having a bore, the said cylindrical clutch housing fitting around the said power shaft; four dowel pins spaced equidistantly and being located in the inner surface of the said cylindrical clutch housing; a clutch locking ring in assembly with steel balls, the said clutch locking ring being actuated by movement of a shifting yoke acting against a set of springs and moving said clutch locking ring causing the said steel balls to move the said dowel pins into the said slots in the said power shaft.

4 Claims, 4 Drawing Figures

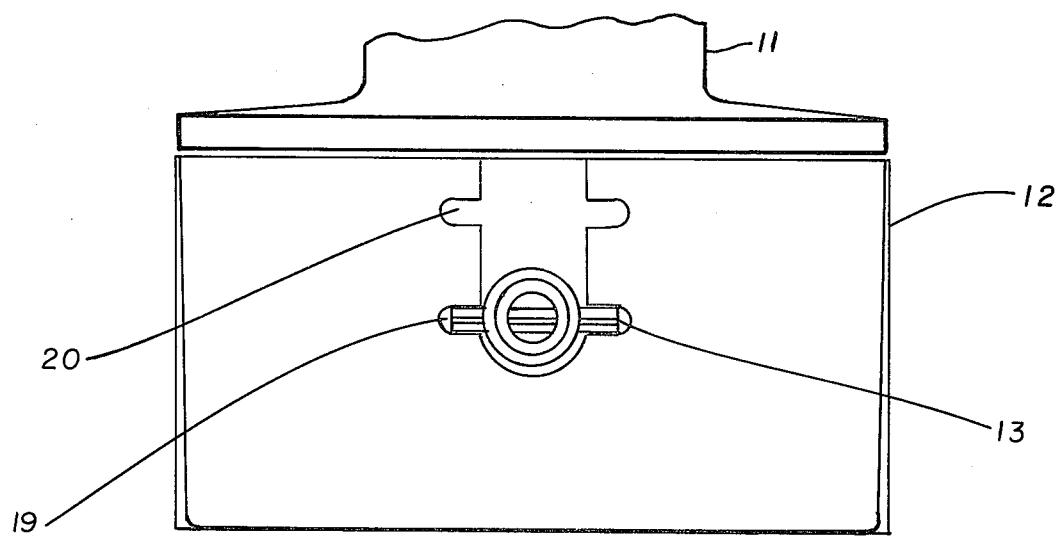
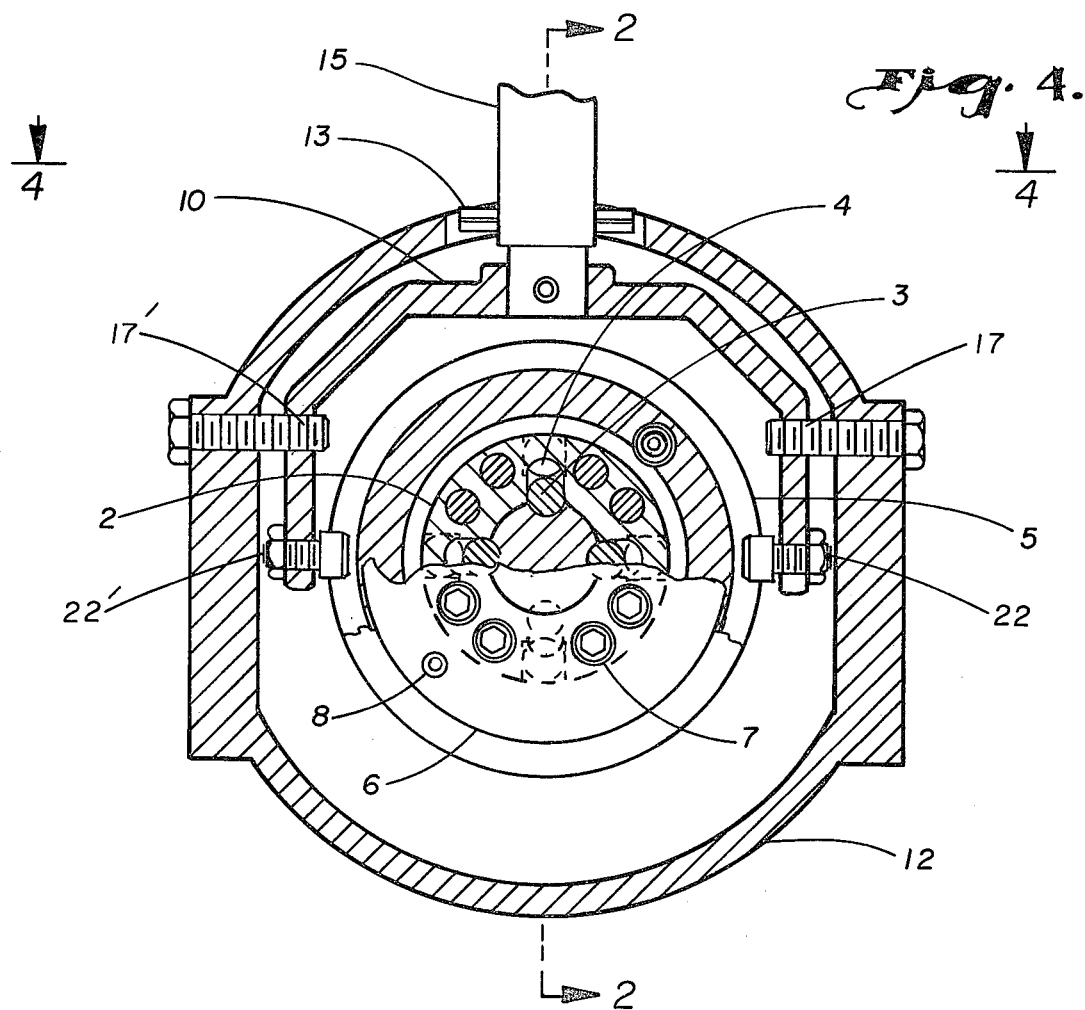
Fig. 4.
Fig. 1.

WINCH CLUTCH

BACKGROUND OF THE INVENTION

This invention relates to an improvement in the structure of a winch clutch and provides locking means which operate with assurance of safety in winch operation.

DESCRIPTION OF THE PRIOR ART

The patent to White, U.S. Pat. No. 1,163,386, issued Dec. 7, 1915, shows a clutch which operation is powered through a worm gear 10 attached to a shaft 2 with friction disks 22 as driving disks, and disks 20 as the driven disks. Contact between disks 22 and disks 20 is accomplished by shifting a movable central device which through rolling members forces the disks 20 and 22 into contact with each other. Applicant does not use disks as a means of clutching. The means of clutching used by applicant are not suggested or disclosed by White.

The patent to Dodge, U.S. Pat. No. 2,735,528, issued Feb. 21, 1956, shows tooth clutch structure which enables the transmission of power in shiftable gear transmission for engaging and disengaging under variable driving conditions producing different driving ratios. Balls 24, FIG. 1 and FIG. 4, are useful in the movement of shift collar 28 when shifting the transmission in and out of gear. This structure is entirely different from the structure disclosed by the applicant.

The patent to Wolf, U.S. Pat. No. 2,639,015, issued May 19, 1953, shows a cam operated clutch which is spring loaded. The high clamping force is created by forcing steel balls radically inward into tapered slots forcing the movement of clamping plate 16 FIG. 4 against sheave 14 which engages plate 12.

This functions entirely different from the invention concept shown herein as will be disclosed in the following paragraphs.

SUMMARY OF THE INVENTION

The present invention presents a new and novel clutch operation in a winch assembly. This clutch assembly includes locked in features which heretofore have not been used in a winch clutch assembly. The features incorporated in this clutch locks the cable drum directly in the power shaft.

The shifting spring loaded clutch handle travel is controlled by a two position locking device which locks the clutch in either a disengaged or engaged position so that the mode of operation can only be changed by lifting the locking pin on the shifting clutch handle from an engaged position to a disengaged position or visa versa. However, the operation of this winch clutch is not confined to the handle herein described. Novelty is noted in the engaging means between the power shaft and the cable drum wherein the shifting and movement of the steel dowel pins locks the power shaft with the cable drum to make a positive secure connection between the power shaft and the cable drum. This is accomplished when the steel dowel pins fall into slots in the power shaft by movement of the clutch handle from position second to position first. The clutch handle movement causes steel balls to place the steel dowel pins to rest in the slots in the power shaft. The clutch handle is locked in an engaged position first and held in that first position by a locking pin. To disengage the clutch, the clutch handle is unlocked, by raising the locking pin located on the clutch handle and moving it to position second which locks the clutch handle securely in this position.

BRIEF DESCRIPTION OF THE DRAWINGS

FIG. 1 is a partial cross-sectional view of the winch clutch assembly.

FIG. 4 is a top view of the clutch assembly which shows the locking pin in a engaged position.

DESCRIPTION OF THE PREFERRED EMBODIMENTS

Figure 2:
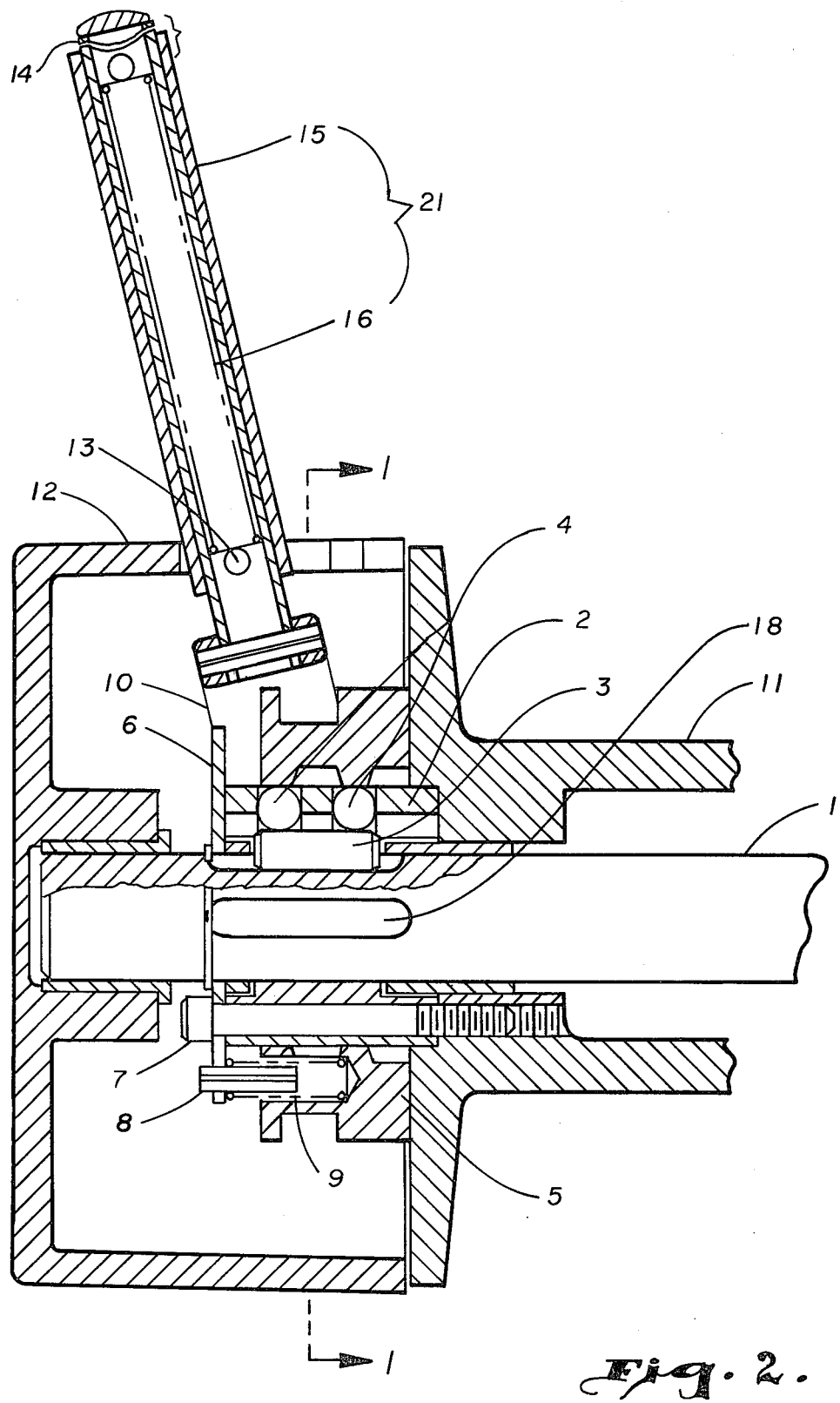
FIG. 2 is a cross-sectional side view of the winch clutch assembly in engaged position.

FIG. 1 shows a partial cross-sectional view of the winch clutch in engaged position. The clutch 2 holds four steel dowel pins 3 and eight steel balls 4 in assembly comprising four groupings containing one steel dowel pin 3 and two steel balls 4 each. The clutch housing locking ring 5 with two grooves on the inner surface moves over the surface of the clutch 2. The retainer plate 6 is used to mount eight screws 7 which attach the clutch housing 2 to the cable drum 11, FIG. 2. A guide post 8 is also assembled on the retainer plate 6 and is useful for aligning springs 9, FIG. 2. Yoke 10 is mounted at pivot point 17 and 17' and moves in a groove at positions 22 and 22' in clutch locking ring 5. The yoke 10 is pivotly attached to body 12 at 17 and 17'. Locking pin 13 is shown in place attached to movable outer tube 15 which is part of the shifting handle made up of inner tube 14, FIG. 2 and the movable outer tube 15. Outer tube 15 which is spring loaded moves in an up and down direction.

Figure 3:
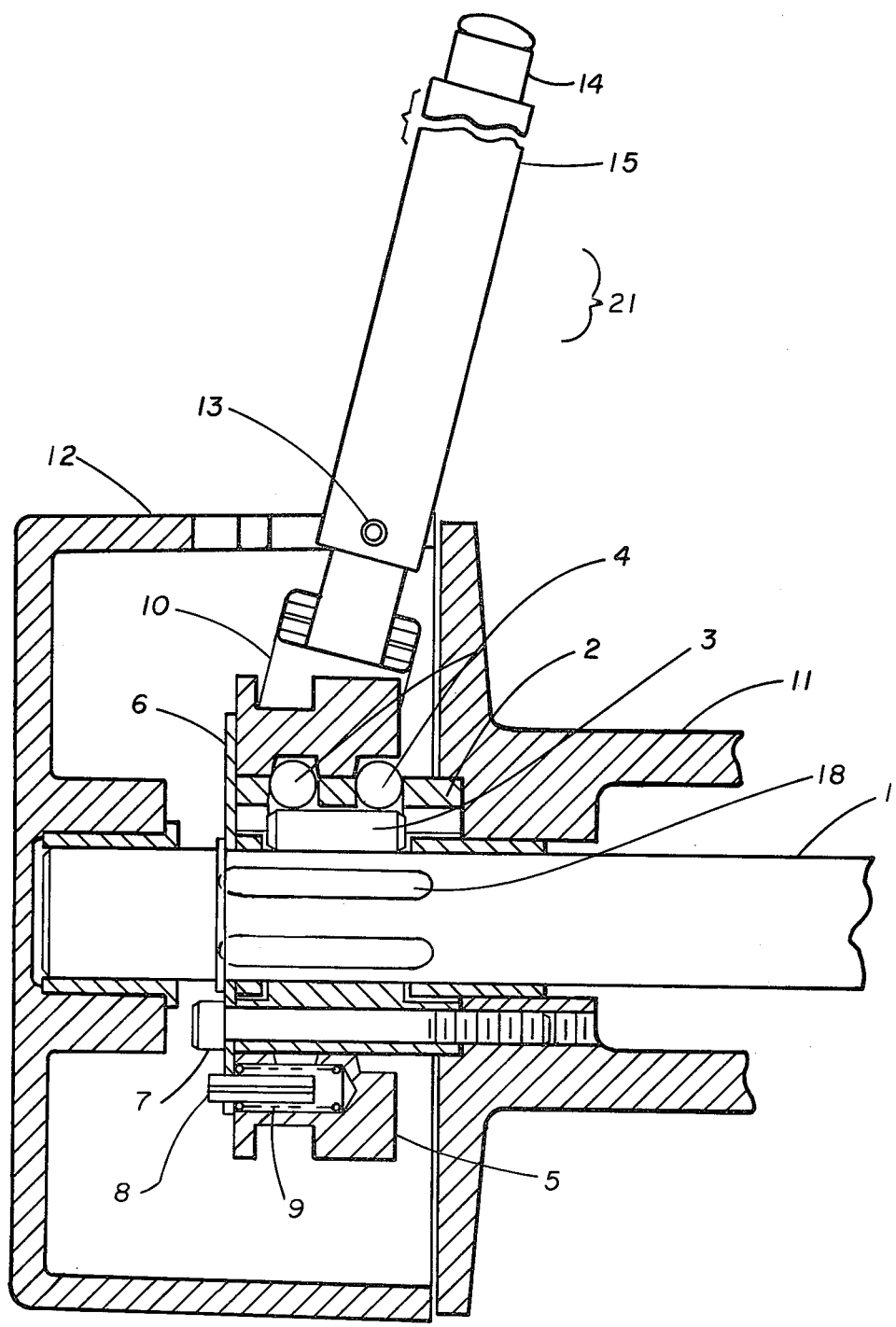
FIG. 3 is a cross-sectional side view of the winch clutch assembly in a disengaged position.

FIG. 2 is a cross-sectional view of the clutch assembly in an engaged position. The clutch enclosure case 12 which holds the complete clutch assembly supports one end of the power shaft 1. Clutch housing 2 holds eight steel balls shown as 4 and four steel dowel pins shown as 3 in the assembly. As stated in the preceding paragraph, retainer plate 6 with eight cap screws 7 hold clutch housing 2 attached to cable drum 11. See FIGS. 1, 2 and 3. Guide post 8 supports a spring 9 which is located in a hole in the clutch locking ring 5. Shifting handle 21 is shown in the engaged position in FIG. 2. Sliding clutch locking ring 5 has moved into position moving steel balls 4 and steel dowel pins 3 from an upper position as shown in FIG. 3 to a lower position as shown in FIG. 2. The steel dowel pins 3 are shown resting in slot 18 which locks power shaft 1 tightly to clutch housing 2 which is attached to cable drum 11; locking pin 13 shown in FIG. 4 is shown on shifting handle 21, FIG. 2. The outer tube of shifting handle 21 is shown as 15, spring 16 is located within the inner tube of shifting handle 21.

FIG. 3 is a cross-sectional view of the winch clutch in a disengaged position. The component parts are identical to the parts shown in FIG. 2. The shifting handle 21 is shown in a disengaged position in FIG. 3. In this view the steel balls 4 have moved into the grooves in the clutch locking ring 5 and the steel dowel pins 3 have moved out of the slots 18 in the power shaft 1. The cable drum 11 is shown disconnected in FIG. 3 and is free to rotate.

FIG. 4 is a partial top view of the housing 12 showing the engaged and the disengaged slots 19 and 20 in the top structure of housing 12. The slots are numbered 19 (engaged) and 20 (disengaged). The position locking pin 13 is shown in engaged position.

OPERATION OF THE WINCH CLUTCH

The winch clutch should be in position as shown in FIG. 3. The power shaft 1 is set into rotation, the spring loaded outer tube 15 in the shifting handle 21 is raised to get the locking pin 13 unseated from position 20, FIG. 4.

The shifting handle 21 is manually moved to position 19, FIG. 4. At the same time yoke 10, FIG. 1 which fits into a slot in the clutch locking ring 5 moves the clutch locking ring 5 into position shown in FIG. 2. As the handle is moving from position 19, FIG. 4, power shaft 1 is rotating. To place the dowel pins 3, FIG. 2 into the slots in power shaft 1 requires manual pressure on the yoke 10, FIG. 1 which moves the clutch locking ring 5, FIG. 2 over the shifting surface of the clutch housing 2, FIG. 2. The clutch locking ring 5, FIG. 2 exerts pressure on the steel balls which in turn force the dowel pins 3 into a locked position as shown in FIG. 2. The clutch is now in engaged position. To disengage the winch clutch assembly, raise outer tube 15 in shifting handle 21 to release locking pin 13, shift to position shown in FIG. 3. In the position cable drum 11 is disconnected from power shaft 1.

Although I have described only a typical preferred form and application of my invention, the invention should not be limited or restricted to specific details herein set forth, but I wish to reserve to myself any variations that may fall into the scope of the following claims.

I claim:

1. In a winch, a clutch assembly comprising a housing, a power shaft having four slots spaced equidistantly on the surface of the said power shaft, a cylindrical clutch housing having a retainer plate mounted on one end of the said cylindrical clutch housing with at least one dowel pin and at least two steel balls located in said cylindrical clutch housing, the said cylindrical clutch housing being attached to a cable drum; a cylindrical clutch locking ring having a pair of grooves therein, being slidably mounted around the said cylindrical clutch housing, the said cylindrical clutch locking ring being actuated by a yoke pivotly mounted on the clutch housing; the said yoke being attached to a clutch handle.

2. The clutch assembly as claimed in claim 1 wherein the clutch handle comprises an inner tube, an outer tube, with a spring mounted within the inner tube against a clutch position pin, the said spring acting to maintain the said clutch position pin in a slot in the said clutch housing of the said clutch assembly.

3. The clutch assembly as claimed in claim 1 wherein the said sliding movement of cylindrical clutch locking ring is motivated by at least two springs mounted in the said retainer plate.

4. The clutch assembly as claimed in claim 1 wherein the said cylindrical clutch housing is held attached to the said cable drum by the said retainer plate supported by at least two screw caps.

* * * * *